US011485403B2

(12) United States Patent
Walentowski

(10) Patent No.: US 11,485,403 B2
(45) Date of Patent: Nov. 1, 2022

(54) ROTATION LIMITING MEANS, STEERING SYSTEM, AND METHOD FOR LIMITING A ROTATIONAL MOVEMENT IN A STEERING SYSTEM

(71) Applicant: ZF Automotive Germany GmbH, Alfdorf (DE)

(72) Inventor: Stephan Walentowski, Düsseldort (DE)

(73) Assignee: ZF Automotive Germany GmbH, Alfdorf (DE)

( * ) Notice: Subject to any disclaimer, the term of this patent is extended or adjusted under 35 U.S.C. 154(b) by 177 days.

(21) Appl. No.: 16/939,357

(22) Filed: Jul. 27, 2020

(65) Prior Publication Data

US 2021/0024122 A1 Jan. 28, 2021

(30) Foreign Application Priority Data

Jul. 25, 2019 (DE) .......................... 102019120205.1

(51) Int. Cl.
*B62D 5/00* (2006.01)
*B62D 1/16* (2006.01)
*B62D 15/02* (2006.01)

(52) U.S. Cl.
CPC .............. *B62D 5/001* (2013.01); *B62D 1/16* (2013.01); *B62D 15/021* (2013.01)

(58) Field of Classification Search
CPC .................................. B62D 5/001; B62D 1/16
See application file for complete search history.

(56) References Cited

U.S. PATENT DOCUMENTS

| 5,618,058 | A | * | 4/1997 | Byon | ................... | B62D 1/197 |
| | | | | | | 74/492 |
| 2003/0184072 | A1 | * | 10/2003 | Andonian | .............. | B62D 5/001 |
| | | | | | | 280/779 |
| 2016/0355207 | A1 | * | 12/2016 | Urushibata | ............ | B62D 5/005 |
| 2018/0105198 | A1 | * | 4/2018 | Bodtker | ................... | B62D 1/16 |

FOREIGN PATENT DOCUMENTS

| DE | 102012024946 A1 | * | 6/2013 | .......... | B60R 25/021 |
| DE | 102018114729 A1 | | 12/2018 | | |
| DE | 102019210384 A1 | | 2/2020 | | |
| JP | 6393858 B1 | | 9/2018 | | |

* cited by examiner

*Primary Examiner* — Jacob D Knutson
(74) *Attorney, Agent, or Firm* — Robert James Harwood

(57) ABSTRACT

A rotation limiting means for a steer-by-wire steering system comprises a fixedly arranged outer housing and a steering column which is received at least partially in the outer housing and can be rotated relative to the outer housing. Furthermore, at least one actuating member is provided which is arranged between the outer housing and the steering column and can be rotated to a limited extent relative to the outer housing and relative to the steering column, in order to mechanically limit a rotation of the steering column relative to the outer housing. Furthermore, a steering system and a method for limiting a rotational movement in a steering system are described.

20 Claims, 3 Drawing Sheets

ROTATION LIMITING MEANS, STEERING SYSTEM, AND METHOD FOR LIMITING A ROTATIONAL MOVEMENT IN A STEERING SYSTEM

CROSS-REFERENCE TO RELATED APPLICATION

This application claims priority to German Patent Application No. 102019120205.1 filed Jul. 25, 2019, the disclosure of which is incorporated herein by reference in its entirety.

TECHNICAL FIELD

The invention relates to a rotation limiting means for a steer-by-wire steering system. Furthermore, the invention relates to a steering system and to a method for limiting a rotational movement in a steering system.

BACKGROUND

Electromechanical power steering systems which are also called "Electric Power Steering" (EPS) systems are known from the prior art. Here, the steering wheel of the steering system is coupled mechanically via a steering column to a rack. The translational movement of the rack is limited mechanically here, which automatically limits the rotation of the steering wheel.

This is important, since, inter alia, electric lines are provided on the steering wheel, which electric lines lead to operating elements on the steering wheel, the electric lines running along the associated steering column or steering shaft, with the result that the electric lines are likewise turned or twisted when the steering wheel is rotated. The electric lines can follow only a limited rotational movement, however, before they break or snap. In this respect, the rack or its mechanical limiting means assumes a protective function for the electric lines.

In the case of what are known as steer-by-wire steering systems (SBW steering systems), the steering wheel is no longer connected mechanically via the steering column to a rack, but rather is connected to a steering wheel actuator which has no mechanical connection to the rack. In this respect, there is precisely no mechanical limiting of the rotational movement of the steering wheel in the case of a steer-by-wire steering system on account of the absence of a mechanical coupling to the rack. In addition, in the case of many SBW steering systems, the steering wheel angle is detected via a steering angle sensor, the calibration of which is valid in the steering system only as long as the steering wheel cannot be rotated beyond a certain steering angle range.

SUMMARY

It is the object of the invention to provide a rotation limiting means in a steer-by-wire steering system, with the result that mechanical limiting of the rotational movement of the steering wheel is possible.

According to the invention, the object is achieved by way of a rotation limiting means for a steer-by-wire steering system, comprising a fixedly arranged outer housing and a steering column which is received at least partially in the outer housing and can be rotated relative to the outer housing. Furthermore, at least one actuating member is provided which is arranged between the outer housing and the steering column and can be rotated to a limited extent relative to the outer housing and relative to the steering column, in order to mechanically limit a rotation of the steering column relative to the outer housing.

Furthermore, the object is achieved according to the invention by way of a method for limiting a rotational movement in a steering system, a steering column being rotated in a rotational direction relative to a stationary or non-rotational outer housing. The steering column bears against an actuating member from a defined rotational angle, which actuating member is further rotated in the rotational direction together with the steering column until the actuating member bears against the outer housing when a limiting angle is reached, in order to mechanically limit the relative rotational movement of the steering column relative to the outer housing.

It is the basic concept of the invention that the rotation of the steering column relative to the fixedly arranged outer housing is limited mechanically by an actuating member being provided which is provided between the steering column and the outer housing and can be rotated relative to the steering column and relative to the outer housing. The actuating member which is connected in between ensures that a relative rotational movement of the steering column with respect to the outer housing is possible, which relative rotational movement is more than 180 starting from a center position. This would not be the case, for example, if the steering column and the outer housing were provided in each case with corresponding stops, since the latter would bear against one another at the latest from a relative rotation of less than 180°.

In this respect, the rotation limiting means is configured to be active only from a relative rotational angle of greater than 180°.

Without an actuating member, only rotational angle ranges of less than 180° can be achieved. According to the invention, however, a value of less than 180°, for example of between 120° and 160°, is added per actuating member. Here, the specific additional rotational angle range is dependent, inter alia, on the application, since the components are wider if they have to absorb high torques.

It is possible, for example, that a relative rotational angle of more than 250°, in particular 400° or more, can be achieved.

The actuating member is arranged as an additional rotational position between the radially inner steering column and the radially outer outer housing of the rotation limiting means.

The steering column, the actuating member and/or the outer housing are/is fundamentally configured in such a way that they can absorb a torque which typically occurs in the case of steering. This ensures that the rotation limiting means is not damaged if the vehicle driver continues to exert a torque even in the end position of the rotation limiting means, that is to say in the case of the active mechanical limiting means.

One aspect provides that the steering column is configured as a driver which drives the actuating member in the case of rotation of the steering column by a defined rotational angle. In this respect, the steering column is first of all adjusted relative to the actuating member and relative to the outer housing until the defined rotational angle is reached. The steering column drives the actuating member from the rotational angle, with the result that the steering column and the actuating member are rotated together relative to the outer housing, in particular about a common rotational axis.

In this respect, the actuating member can rotate together with the steering column relative to the outer housing from a defined rotational angle in the case of rotation of the steering column. The actuating member and the steering column can have a common rotational axis which lies, in particular, centrally in relation to the steering column.

In accordance with one embodiment, the actuating member is a hollow shaft. Accordingly, the actuating member and the steering column are configured coaxially with respect to one another, since they have a common rotational axis and the actuating member receives the steering column at least partially. This fundamentally results in a compact construction of the rotation limiting means.

A further embodiment provides that the actuating member is a sliding element which slides along a predefined track, in particular within a groove. Here, the actuating member which is configured as a sliding element can be moved on a predefined track which has a predefined radius in relation to the center point of the steering column or the rotational axis of the steering column. In this respect, the sliding element likewise moves about the rotational axis of the steering column. The groove which provides the predefined track can be configured within the outer housing or the steering column.

In particular, two or more actuating members are provided which are arranged between the outer housing and the steering column. The rotation of the steering column which can be achieved overall relative to the outer housing can be increased via the number of actuating members. The more actuating members which are provided between the steering column and the outer housing, the greater the relative rotational range which can be achieved. For example, in the case of two actuating members, a relative rotation of ±400° can already be achieved between the steering column and the outer housing.

In the case of more than one actuating member, the first actuating member can be configured as a hollow shaft and the second actuating member can be configured as a sliding element, the hollow shaft and the sliding element interacting. In other words, the actuating members can interact, since in each case a rotational movement is transmitted from the radially innermost rotatable component of the rotation limiting means to the radially outermost rotatable component of the rotation limiting means. This means that, starting from the steering column, the rotational movement is transmitted to the further actuating members which lie radially further to the outside, in particular as far as the actuating member which interacts with the fixedly arranged outer housing. In other words, the radially outermost actuating member interacts with the fixedly arranged outer housing, in order to mechanically limit the rotation of the steering column relative to the outer housing.

The actuating members are fundamentally of rotatable configuration.

One aspect provides that the steering column has at least one radially outwardly projecting driver section, in particular with two opposed driver faces. The driver section can be configured as a radially outwardly projecting lug which has two driver faces which are configured on opposite sides of the lug. This ensures that the associated actuating member can be actuated by the driver section, in particular the corresponding driver face, in both rotational directions starting from the center position.

Furthermore, the actuating member can have a radially inwardly projecting bearing section, in particular with two opposed bearing faces. The bearing section of the actuating member can interact with the driver section of the associated steering column. In particular, the bearing faces interact with the associated driver faces. Depending on the rotational direction of the steering column, the first driver face drives the first bearing face or the second driver face drives the second bearing face, in order to drive the actuating member further in the corresponding rotational direction from the predefined rotational angle, that is to say to rotate it relative to the outer housing.

In addition, the actuating member can have a radially outwardly projecting rotation limiting section, in particular with two opposed rotation limiting faces. The outwardly projecting rotation limiting section can likewise be configured as an outwardly projecting lug which has two rotation limiting faces on opposite sides. In an analogous way with respect to the above-described faces, the rotation limiting faces become active depending on the rotational direction of the steering column.

Furthermore, the outer housing can have a radially inwardly projecting stop, in particular with two opposed stop faces. The radially inwardly projecting stop can likewise be configured as a radially inwardly protruding lug. Depending on the rotational direction of the steering column, the first rotation limiting face of the actuating member bears against the first stop face or the second rotation limiting face of the actuating member bears against the second stop face, in order to mechanically limit the relative rotational movement of the steering column with respect to the outer housing.

In the end positions, the driver section of the steering column comes into contact with the bearing section of the actuating member, and the rotation limiting section of the actuating member comes into contact with the stop of the outer housing. In this respect, in the respective end position, a force which is applied to the steering column is introduced via the actuating member into the outer housing.

The driver section, the bearing section, the rotation limiting section and/or the stop can fundamentally be configured in one piece with the respective associated component of the rotation limiting means, that is to say the steering column, the actuating member or the outer housing.

As an alternative, it can be provided that the driver section, the bearing section, the rotation limiting section and/or the stop are configured separately from a basic element of the corresponding component, that is to say from the basic element of the steering column, the actuating member or the outer housing.

Furthermore, the object is achieved according to the invention by way of a steering system with a rotation limiting means of the abovementioned type, a steering wheel being fastened on the end side to the steering column, and/or a steering wheel actuator being provided which is assigned to the steering column, in particular is coupled to the steering column. Accordingly, the rotation of the steering column can be introduced by the vehicle driver via the steering wheel.

The steering wheel actuator can generate feedback at the steering wheel, which feedback corresponds to the steering feel of a mechanical steering means. In other words, an (electro)mechanical steering system is simulated.

The relative rotation can be limited mechanically via the rotation limiting means in a simple way, without the steering wheel actuator being of more voluminous configuration.

BRIEF DESCRIPTION OF THE DRAWINGS

Further advantages and properties of the invention result from the following description and the drawings, to which reference is made and in which.

DETAILED DESCRIPTION

Figure 1:
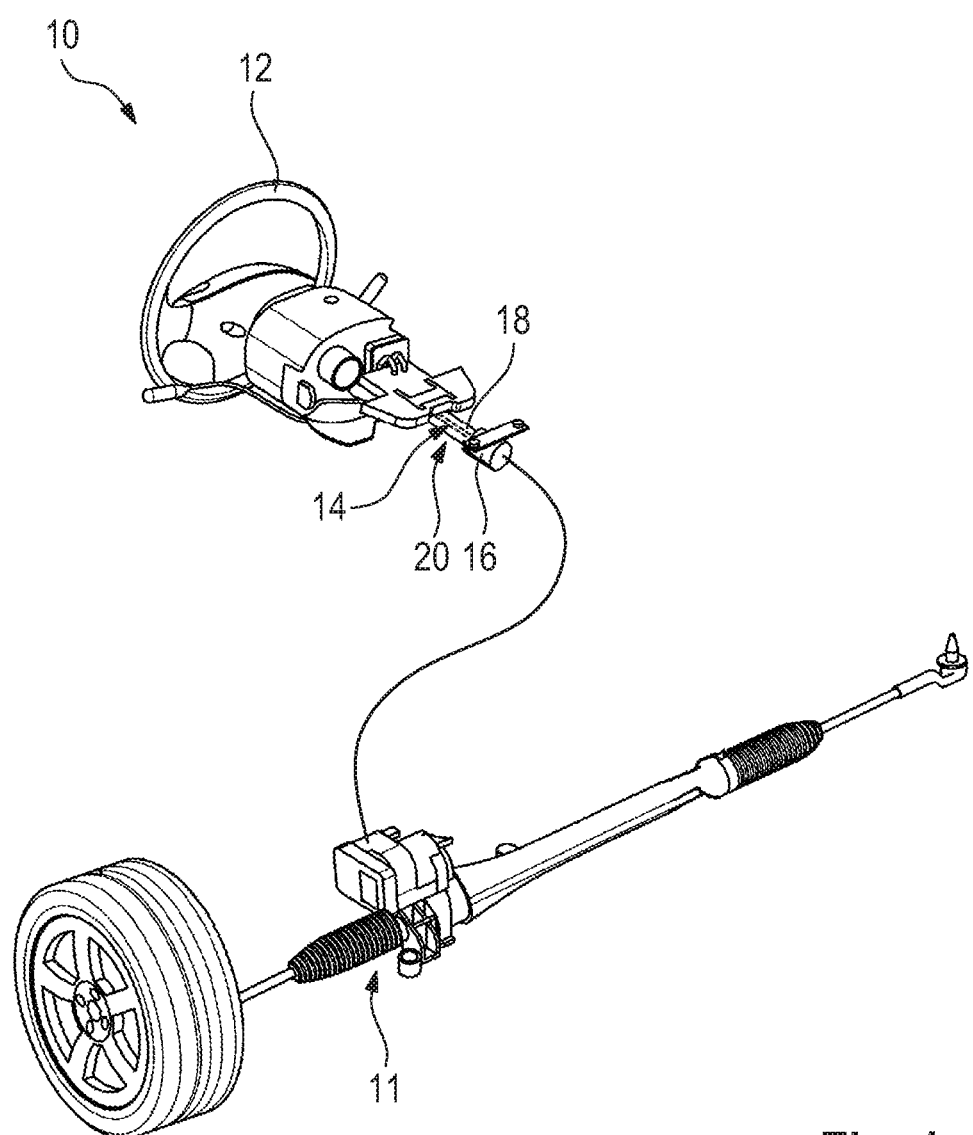
FIG. 1 shows a diagrammatic view of a steering system according to the invention.

FIG. 1 diagrammatically shows a steering system 10 which is configured as a steer-by-wire steering system, that is to say as a steering system without a mechanical connection to a rack 11.

The steering system 10 comprises a steering wheel 12, to which a steering column 14 is fastened on the end side.

Furthermore, the steering system 10 comprises a steering wheel actuator 16 which is assigned to the steering column 14, in particular is coupled to the steering column 14 at the end which is opposite the steering wheel 12.

The steering column 14 is received at least partially in an outer housing 18, with respect to which the steering column 14 can be rotated in a relative manner. In this respect, the steering column 14 is shown using dashed lines in FIG. 1.

In addition, the steering system 10 comprises a rotation limiting means 20 which encloses the steering column 14 and the outer housing 18 at least partially.

Moreover, the rotation limiting means 20 has an actuating member 22 which is arranged between the outer housing 18 and the steering column 14. The actuating member 22 cannot be seen in FIG. 1, but can be seen in FIGS. 2 and 3, to which reference is still to be made in the following text.

The actuating member 22 can fundamentally be rotated relative to the outer housing 18 and relative to the steering column 14.

Figure 2C:
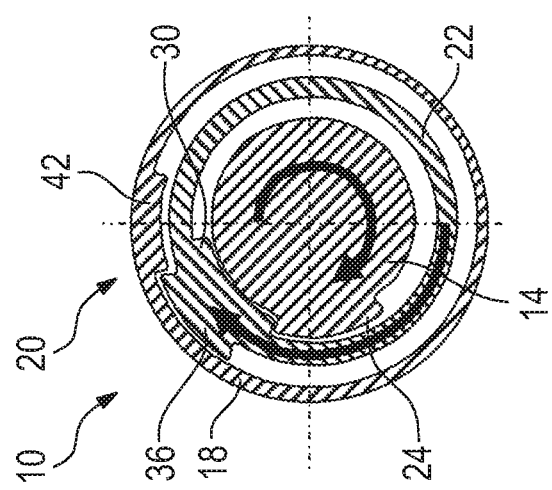
FIG. 2c shows a sectional view of a rotation limiting means according to the invention in accordance with a first embodiment, in a third state, FIG. 3a show a first sectional view of a rotation limiting means according to the invention in accordance with a second embodiment, in a first state.
Figure 2B:
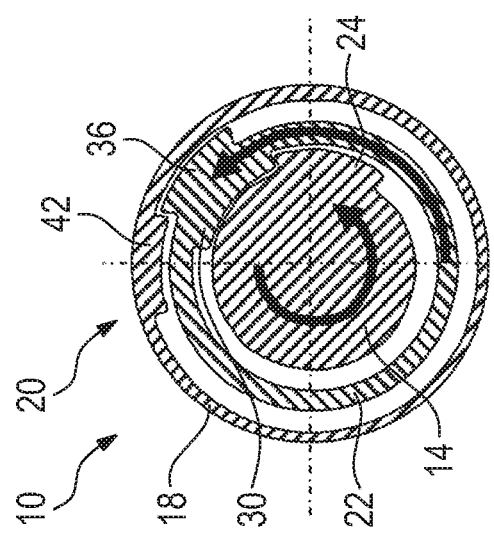
FIG. 2b shows a second sectional view of a rotation limiting means according to the invention in accordance with a first embodiment, in a second state.
Figure 2A:
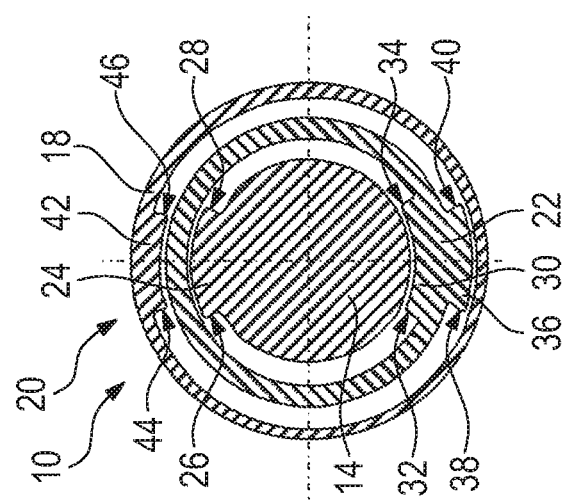
FIG. 2a shows a first sectional view of a rotation limiting means according to the invention in accordance with a first embodiment, in a first state.

FIGS. 2a to 2c show a rotation limiting means 20 in different positions, in each case in the same sectional illustration.

It is apparent from FIGS. 2a to 2c that the actuating member 22 is configured as a hollow shaft which lies between the steering column 14 which is configured as a solid shaft and the substantially hollow outer housing 18 which is arranged in a rotationally fixed manner.

In other words, the actuating member 22 can be called an additional rotational layer, since it can be rotated to a limited extent relative to the outer housing 18 and relative to the steering column 14.

It becomes clear from FIG. 2a, in which a neutral or starting position is shown, that the steering column 14 has a radially outwardly projecting driver section 24 which is configured as a lug which has two opposed sides.

The opposed sides of the driver section 24 serve in each case as driver faces 26, 28 which interact with the actuating member 22. In other words, the driver section 24 has two opposed driver faces 26, 28.

Furthermore, the actuating member 22 has a radially inwardly projecting bearing section 30 which likewise comprises two opposed bearing faces 32, 34. The bearing section 30 is likewise configured as a lug which extends radially to the inside.

It has already become clear from FIGS. 2b and 2c that the driver section 24 interacts with the bearing section 30 when the steering column 14 is rotated relative to the outer housing 18, as will still be explained in the following text.

Furthermore, the actuating member 22 has a radially outwardly projecting rotation limiting section 36 which has two opposed rotation limiting faces 38, 40.

Furthermore, the outer housing 18 has a radially inwardly projecting stop 42 which comprises two opposed stop faces 44, 46. The stop 42 of the outer housing 18 interacts with the rotation limiting section 36 of the actuating member 22 in the case of a relative rotation of the steering column 14 when the limiting angle of the permissible relative rotation is reached, as is likewise apparent from FIGS. 2b and 2c.

The driver section 24, the bearing section 30, the rotation limiting section 36 and the stop 42 are in each case configured as radially inwardly projecting or radially outwardly projecting lugs in relation to the otherwise rotationally symmetrically configured steering column 14, actuating member 22 and outer housing 18.

Furthermore, it is apparent from FIGS. 2a to 2c that both the driver section 24, the bearing section 30, the rotation limiting section 36 and the stop 42 are configured in one piece with the respective associated component of the rotation limiting means 20.

It is apparent from FIGS. 2b and 2c which in each case show the end positions of the rotation limiting means 20 and the associated steering system 10 that the steering column 14 is configured as a driver which drives the actuating member 22 in the case of rotation of the steering column 14 by a defined rotational angle.

In the present case, the defined rotational angle is approximately 150°.

In the case of the defined rotational angle, the steering column 14 bears via one of the two driver faces 26, 28 against the associated bearing face 32, 34 of the bearing section 30 of the actuating member 22.

In the case of a further rotation beyond the defined rotational angle, the steering column 14 drives the actuating member 22 via the respective driver face 26, 28, with the result that the steering column 14 is rotated further together with the actuating member 22 in the respective rotational direction until the actuating member 22 bears via its rotation limiting section 36, in particular the respective rotation limiting face 38, 40, against the stop 42 of the outer housing 18, in particular the respective associated stop face 44, 46.

This corresponds to the respective end position of the rotation limiting means 20, which end positions are shown in FIGS. 2b and 2c. FIG. 2b shows the end position for the rotation counter to the clockwise direction, whereas FIG. 2c shows the end position for a rotation in the clockwise direction.

The overall relative rotational movement of the steering column 14 with respect to the outer housing 18 is in total approximately 260°, that is to say more than 180°, in the embodiment which is shown.

This is due to the fact that the steering column 14 is first of all adjusted relative to the actuating member 22, the steering column 14 driving the actuating member 22 and rotating further in the corresponding rotational direction relative to the outer housing 18 until the actuating member 22 bears against the fixedly arranged outer housing 18, in order to mechanically limit the relative rotational movement of the steering column 14 relative to the outer housing 18.

In addition, it is apparent from FIG. 2a which shows the starting position of the rotation limiting means 20 or the steering system 10 that the stop 42 and the driver section 24 of the steering column 14 lie substantially opposite one another in the starting position. Merely the actuating member 22 which is configured as a hollow shaft lies in between. This ensures that as great a relative rotational movement of the steering column 14 with respect to the outer housing 18 as possible is enabled.

Figure 3C:
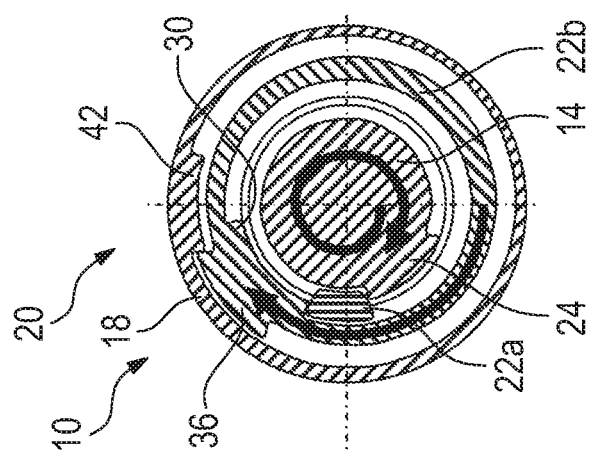
FIG. 3c shows a third sectional view of a rotation limiting means according to the invention in accordance with a second embodiment, in a third state.
Figure 3B:
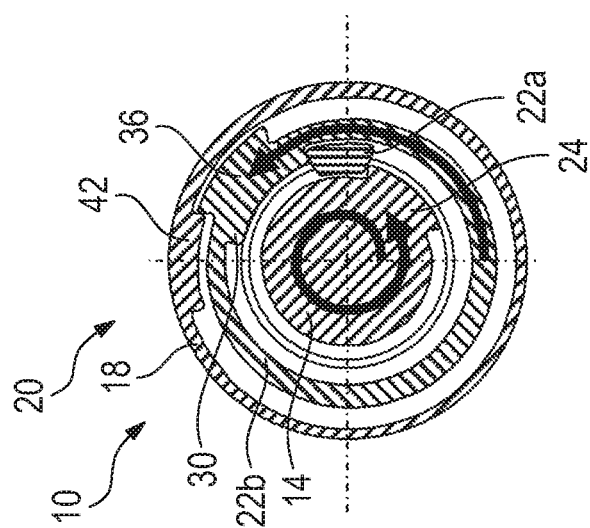
FIG. 3b shows a second sectional view of a rotation limiting means according to the invention in accordance with a second embodiment, in a second state.
Figure 3A:
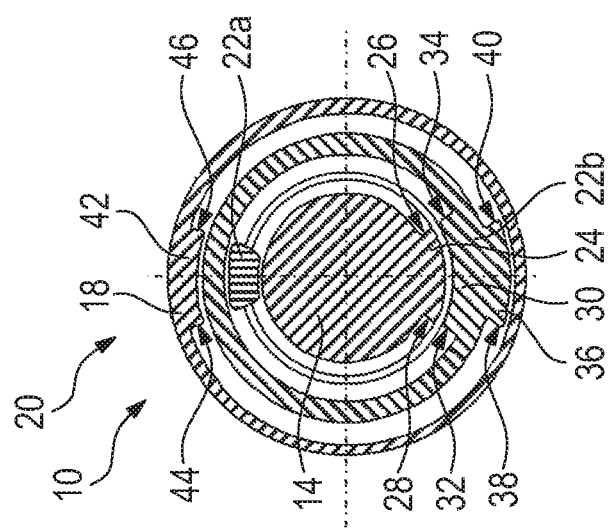

FIGS. 3a to 3c show a second embodiment of the rotation limiting means 20 which differs from the embodiment shown in FIGS. 2a to 2c in that the rotation limiting means 20 comprises two actuating members 22, that is to say a first actuating member 22a and a second actuating member 22b.

Here, the first actuating member 22a is configured as a sliding element which can slide along a predefined track which is formed by way of a groove. In this respect, the first actuating element 22a or the sliding element slides within the groove.

In an analogous way with respect to the first embodiment, the second actuating member 22b is configured as a hollow shaft which interacts with the outer housing 18 in an analogous way, as has been described above.

In contrast to the first embodiment which is shown in FIGS. 2a to 2c, the steering column 14 adjusts the first actuating member 22a, that is to say the sliding element, from the defined rotational angle. The steering column 14 drives the sliding element within the groove until the sliding element, that is to say the first actuating member 22a, interacts with the second actuating member 22b, in order to enable a common relative rotation of the steering column 14, the first actuating member 22a and the second actuating member 22b relative to the fixedly arranged outer housing 18.

On account of the two actuating members 22, a greater rotation angle range can be achieved until the relative rotational movement of the steering column 14 with respect to the outer housing 18 is limited mechanically. In the present example, this is the case at a relative rotational angle of approximately 400°.

If the relative rotational angle range is to be increased further, further actuating members 22 can be provided between the steering column 14 and the outer housing 18, which further actuating members 22 interact with one another in each case, in order to transmit the rotational movement which emanates from the steering column 14 in each case to the next actuating member 22 on the radial outside. This takes place until the last or radially outermost actuating member 22 bears against the outer housing 18 in the case of the limit angle being reached, in order to mechanically limit the relative rotation of the steering column 14 with respect to the outer housing 18.

In this respect, limiting of the relative rotation of the steering column 14 with respect to the outer housing 18 is possible in the case of a steer-by-wire steering system, without changing the steering wheel actuator 16. Accordingly, the latter can still be of comparatively small configuration. This is possible, since the limiting of the relative rotation takes place in a mechanical way via the rotation limiting means 20.

The steering system 10 is therefore of simple configuration and is nevertheless compact, the steering system 10, in particular the rotation limiting means 20, being configured to absorb the forces and torques which occur. In addition, the relative rotational angle which can be achieved can be set via the number of actuating members 22.

What is claimed is:

1. A rotation limiting means for a steer-by-wire steering system, comprising:
   a fixedly arranged outer housing and
   a steering column which is received at least partially in the outer housing and can be rotated relative to the outer housing,
   wherein at least one actuating member having a radially inwardly projecting bearing section is provided which is arranged between the outer housing and the steering column and can be rotated to a limited extent relative to the outer housing and relative to the steering column, in order to mechanically limit a rotation of the steering column relative to the outer housing.

2. The rotation limiting means as defined in claim 1, wherein the steering column is configured as a driver which drives the actuating member via the bearing section in the case of rotation of the steering column by a defined rotational angle.

3. The rotation limiting means as defined in claim 2, wherein the actuating member rotates together with the steering column relative to the outer housing from the defined rotational angle in the case of rotation of the steering column.

4. The rotation limiting means as defined in claim 3, wherein the actuating member is a hollow shaft.

5. The rotation limiting means as defined in claim 2, wherein the steering column has at least one radially outwardly projecting driver section, the driver section driving the actuating member via the bearing section.

6. The rotation limiting means as defined in claim 1, wherein the at least one actuating member includes two or more actuating members arranged between the outer housing and the steering column, at least one of the actuating members having the bearing section.

7. The rotation limiting means as defined in claim 6, wherein at least one of the actuating members is a sliding element which slides along a predefined track.

8. The rotation limiting means as defined in claim 7, wherein the predefined track is formed by a groove.

9. The rotation limiting means as defined in claim 1, wherein the actuating member has a radially outwardly projecting rotation limiting section.

10. The rotation limiting means as defined in claim 9, wherein the outer housing has a radially inwardly projecting stop.

11. The rotation limiting means as defined in claim 1, wherein the steering column rotates the actuating member via the bearing section relative to the outer housing.

12. The rotation limiting means as defined in claim 1, wherein the at least one actuating member includes a first actuating member that is slidable along a predefined track relative to the outer housing, and a second actuating member having the bearing section.

13. The rotation limiting means as defined in claim 12, wherein the steering column drives the first actuating member along the predefined track until the first actuating member engages the bearing section, the first and second actuating members rotating together with the steering column relative to the outer housing after the first actuating member engages the bearing section.

14. A method for limiting a rotational movement in a steering system, a steering column being rotated in a rotational direction relative to a stationary outer housing, the steering column bearing against a radially inwardly projecting bearing section of an actuating member from a defined rotational angle, the actuating member is rotated further in the rotational direction together with the steering column until the actuating member bears against the outer housing when a limiting angle is reached, in order to mechanically limit the relative rotational movement of the steering column relative to the outer housing.

15. The method as defined in claim 14, wherein the steering column has at least one radially outwardly projecting driver section, the driver section driving the actuating member via the bearing section.

16. The method as defined in claim 15, wherein the actuating member has a radially outwardly projecting rotation limiting section, the outer housing has a radially inwardly projecting stop, and the actuating member rotates in the rotational direction together with the steering column until the rotation limiting section bears against the stop when the limiting angle is reached.

17. The method as defined in claim 15, wherein the actuating member includes a first actuating member that is slidable along a predefined track relative to the outer housing and a second actuating member having the bearing section, the driver section of the steering column driving the first actuating member along the predefined track until the first actuating member engages the bearing section, the first and second actuating members rotating together with the steering column relative to the outer housing after the first actuating member engages the bearing section and until the second actuating member bears against the outer housing.

18. The rotation limiting means as defined in claim 10, wherein the steering column has at least one radially outwardly projecting driver section, the driver section driving the actuating member via the bearing section.

19. The rotation limiting means as defined in claim 18, wherein the at least one actuating member includes a first actuating member that is slidable along a predefined track relative to the outer housing, and a second actuating member having both the bearing section and the rotation limiting section.

20. The rotation limiting means as defined in claim 19, wherein the driver section of the steering column drives the first actuating member along the predefined track until the first actuating member engages the bearing section, the first and second actuating members rotating together with the steering column relative to the outer housing after the first actuating member engages the bearing section and until the rotation limiting section bears against the stop.

* * * * *